Oct. 29, 1957     H. I. SLONE ET AL     2,811,592
ELECTRIC SWITCHES

Filed May 19, 1954     2 Sheets-Sheet 1

INVENTORS
HOWARD I. SLONE
DAVID P. CLAYTON
BY EDWARD L. BARCUS

ATTORNEY

Oct. 29, 1957  H. I. SLONE ET AL  2,811,592
ELECTRIC SWITCHES
Filed May 19, 1954  2 Sheets-Sheet 2
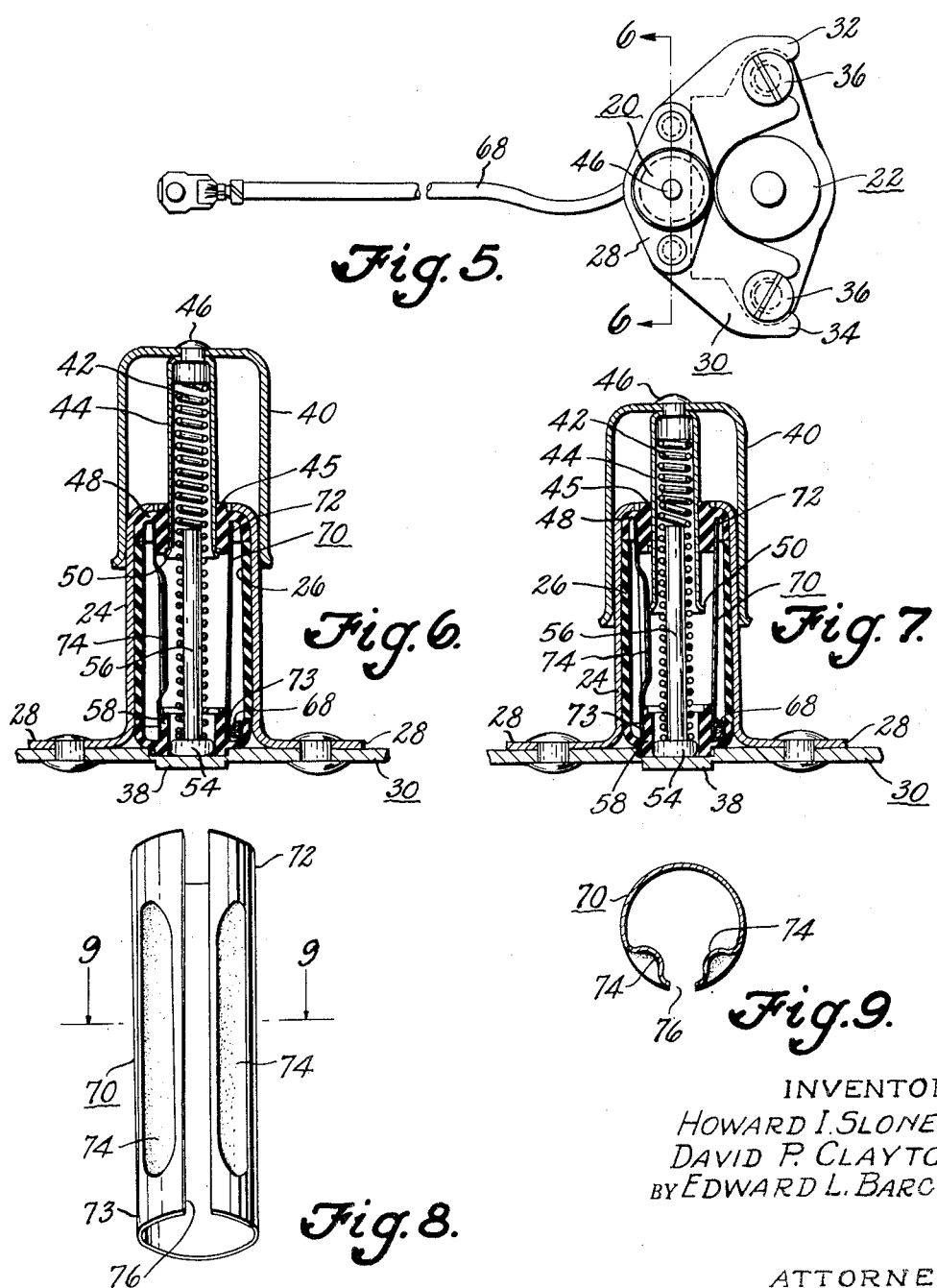
INVENTORS
HOWARD I. SLONE
DAVID P. CLAYTON
BY EDWARD L. BARCUS
ATTORNEY 2,811,592
Patented Oct. 29, 1957

2,811,592
ELECTRIC SWITCHES

Howard I. Slone, Alexandria, and David P. Clayton and Edward L. Barcus, Anderson, Ind., assignors to General Motors Corporation, Detroit, Mich., a corporation of Delaware Application May 19, 1954, Serial No. 430,778

5 Claims. (Cl. 200—5)

This invention relates to electric switches and more particularly to a switch that will temporarily modify the operation of an automatic dimming device in a headlamp circuit of a vehicle.

It is an object of the present invention to include a pair of switches in a plurality of circuits to the headlight of a vehicle so that one of the switches acts as a foot rest when the other switch is depressed and modifies the operation of the headlights as selected by the first switch.

It is another object of the present invention to provide a reciprocal plunger type switch with a contact that cooperates with the plunger and closes a circuit when the plunger is moved between its limits of reciprocal travel and opens the circuit when the plunger is at either of said limits.

It is a further object of the present invention to group two reciprocal plunger type switches for controlling the headlight circuits of a vehicle so that one of the switches, which when depressed selectively places the headlamps of the vehicle in either a low beam circuit or under the control of a device which will circuit the headlamps in either a high or low beam position depending on certain conditions, and wherein said first switch also acts as a footrest when the second switch is depressed between the limits of its range of movement to modify the control of said device and thereby place the lamps temporarily in a high beam position for signalling and other purposes and wherein said second switch is without effect on the device when the switch is at either of its limits of its range of movement as when said first and second switches are simultaneously fully depressed for changing the selection of said circuits.

The automatic control of headlamps of the present day vehicle has done much to increase the comfort and safety of operation of vehicles. These automatic devices, which are included in the headlamp circuits, generally are responsive to external conditions as light from an external source and accordingly automatically vary the illuminating effect of the lights of the vehicle in response to the emission of light from an oncoming vehicle. To further increase the effect of operation of the headlamps of a vehicle in connection with the use of an automatic device, it has been found desirable to provide a switch whereby the driver of the vehicle may either indefinitely place the headlamps on a low beam position or under the control of an automatic device which responds to the light from the headlamps of the approaching vehicle and accordingly changes the lights from a high beam to a low beam position to permit the oncoming vehicle to pass in greater safety. Frequently the drivers of oncoming vehicles do not dim their lights unless a request is made as by signalling them to do so. To accomplish this signalling, a second switch is placed so that it may be simultaneously depressed with the first switch or may be depressed when the first switch acts as a foot rest so as to modify the operation of the automatic device and temporarily place the lamps of the vehicle in the upper beam position.

Further objects and advantages of the present invention will be apparent from the following description, reference being had to the accompanying drawings wherein a preferred embodiment of the present invention is clearly shown.

In the drawings:

Figure 5 is a plan view of a foot dimmer switch similar to that shown in Figure 1 and includes a switch embodying a modification according to the present invention.

Figure 6 is a view along line 6—6 in Figure 5 showing the switch in a fully extended position.

Figure 7 is a view along line 6—6 in Figure 5 showing the switch in a partially depressed position.

Figure 8 is a perspective view of a contact member according to the modification of the present invention.

Figure 9 is a view taken along line 9—9 in Figure 8.

Figure 1:
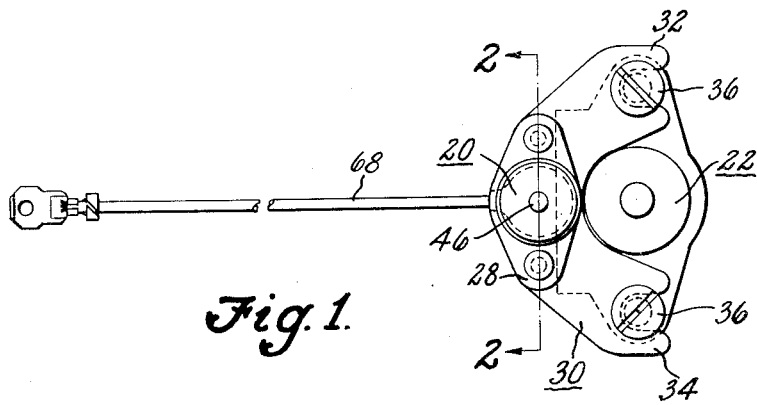
Figure 1 is a plan view of a foot dimmer switch and the switch according to the present invention.

In the drawings and in Figures 1 to 4 particularly the numeral 20 designates an auxiliary foot dimmer switch that is mounted in a grouped position with a suitable type foot dimmer switch 22 such as disclosed in Patent 2,496,118, as issued to W. E. Brown and assigned to the assignee of the present invention.

An outer case member 24 which forms a portion of switch 20 has a lining 26, of insulating material, and a pair of oppositely disposed flanges 28 that are riveted to a central portion of U-shaped support member 30 that has arms 32 and 34, suitably apertured and formed; to embrace the standard dimmer switch 22 and thus permit the switches 20 and 22 to be grouped together and fastened to a support, not shown, with common mounting screws or bolts 36. Member 30 also has a boss portion 38 formed thereon. This boss 38 acts as a support for the switch 20 when a cut-like cap 40 is depressed against the force of a spring 42, and telescopes over support 24.

A thimble-shaped plunger element 44, secured to the inside of cap 40 by rivet 46, is guided during its reciprocating motion through an aperture 45 in the top portions of support 24 by an annular sleeve 48 that is located adjacent aperture 45 and integrally formed on liner 26. The plunger 44 has an outwardly flared end 50 which engages a rim portion of the sleeve 48 and limits the upward movement of the plunger 44 against the force of spring 42, which has one end seated on rivet 46 and the other seated on an enlarged end 54 of a shaft 56. The spring further surrounds shaft 56 and is received within the plunger 44 so that it may be suitably guided as it is compressed as when the element 44 is telescoped over shaft 56 which has its enlarged end 54 received in a sleeve 58 that is formed on the bottom of inner liner 26, so that end 54 may rest on the depressed portion of support member 30 which forms boss 38.

Figures 2, 3:
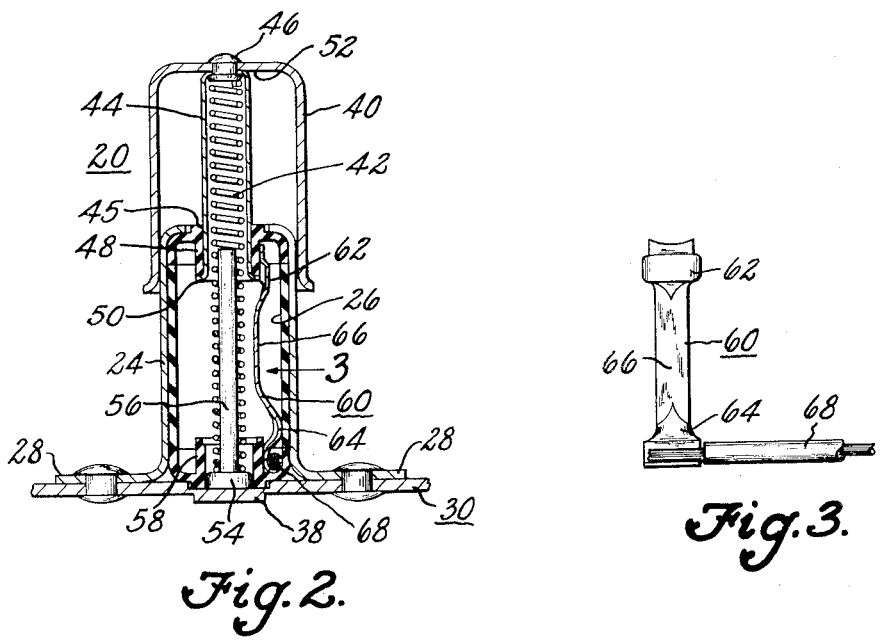
Figure 2 is a view along line 2—2 in Figure 1.
Figure 3 is a view of the contact member taken in the direction of arrow 3 in Figure 2.
Figure 4:
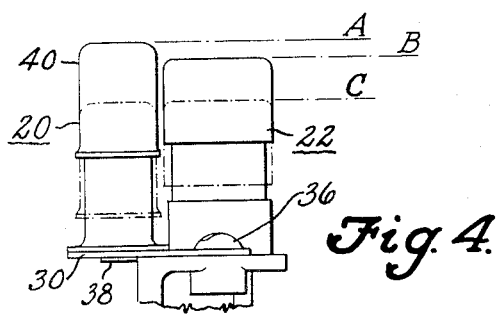
Figure 4 is an elevation view of the switches in Figure 1.

The contact spring element 60, shown in Figures 2 and 3, is longitudinally aligned with and spaced from plunger sleeve 44. This contact element 60 is formed to have an inwardly disposed intermediate portion 66 of substantial length and outwardly disposed or bent end portions 62 and 64 that are formed so that the flange portion 50 of the plunger 44 will make a sliding contact only with the intermediate portion 66 and will not contact the end portions 62 and 64 when the plunger 44 is reciprocally moved throughout its range of travel. The end portion 62 is held in position and in contact with the outer surface of guide sleeve 48 through stress exerted on the intermediate portion 66 of contact 60 by the end portion 64 which is held between the inner surface of liner 26 and the outer walls of sleeve 58 as formed on the bottom portion of the liner 26. In Figures 5 to 9 a modification of the contact for switch 20 is shown. In this embodiment all other portions of the switch are similar and like numerals therefore refer to corresponding parts. The contact 70 of the modification replaces contact 60 supra. This contact 70 is preferably formed of a length of tubing or rolled piece of metal of suitable size so that ends 72 and 73 of contact 70 will respectively embrace guide sleeve 48 and sleeve 58 and will be out of contact with the flange portion 50 of plunger 44 when the plunger is reciprocally moved throughout its range of travel. Contact 70 is formed with indentations 74 which are sized and of substantial length to form a sliding contact with flange 50 over a predetermined length of travel of guide sleeve 48 as the sleeve 48 is reciprocally moved between its limits of travel. The contact 70 is preferably provided with a slit 76 that extends over its entire length. This slit will facilitate assembly of the contact 70 about sleeves 48 and 58 and will also permit the contact 70 to radially expand and thereby insure a sliding contact without binding between the indentation 74 and flange 50 if the indentations are of sufficient depth so that the sleeve 58 will cause the contact 70 to expand. In this embodiment it is manifest either one or more than two indentations 74 may be formed in contact 70 without departing from the spirit of the present invention.

An end of electrical conductor 68, secured to the end 64 of contact member 60 or to end 73 of contact 70 by some suitable means, such as soldering, is connected to the circuit containing the automatic dimming device, not shown, as for an example, as disclosed in application Ser. No. 430,939 as concurrently filed herewith by Lloyd T. Fugua and Harry C. Doane and assigned to the assignee of the present invention. When conductor 68 is properly connected with the automatic dimming device and switch 20 is depressed, the flange portion 50 will contact the intermediate portion 66 of contact 60, and a portion of the automatic dimming circuit will be grounded or electrically connected to the support structure 30 through the various portions of the switch as is clearly apparent from the drawings and thus modify the operation of the automatic dimming device.

When switch 22 is properly connected in the various circuits as is shown in the Fugua application supra and the switch is in one of its positions, it will place the headlamps of the vehicle on the manual lower beam position. This position may be changed by depressing switch 22 so that the contact portions, not shown, are moved another position to place the headlights of the vehicle in a circuit under the control of an automatic device which will cause the headlights to be in either the low or high beam position depending upon certain conditions. When the automatic device has circuited the headlights in the low beam position and a temporary high beam position is desired, switch 20 may be depressed by the foot of the driver a distance from A to B in Figure 4. During these periods, when switch 20 is depressed, the standard foot switch serves as a foot rest as the spring 42 is selected so that its resistance to compression is far less than the force required to depress switch 22 and the height of switch 20 is preferably slightly greater than switch 22. When switch 20 is depressed from A to B, contact sleeve 50 passes from the position of no contact with contact 60 at end portion 62 to slidingly engage the intermediate section 66 and from an electrical connection therebetween and thus close a circuit which modifies the operation of the automatic dimming device so as to place headlamps in the upper beam circuit as long as contact is made between flange 50 and the section 66 of spring member 60. Further it is manifest that both switches 20 and 22 may be simultaneously and fully depressed as from A to C in Figure 4. When this occurs and the switch 20 has initially placed the circuits under the control of the automatic device, the lights will be temporarily flashed to the high beam circuit as the flange portion 50 engages the intermediate portions of contacts 60 or 70 and until the plunger sleeve 44 reaches the limit of its downward travel so that the flange 50 is moved beyond intermediate portions 66 of contact 60 and intermediate indentations 74 of contact 70 and is adjacent the portion of the contact members occupied by the ends 64 or 73 and the contact between flange 50 and contact 60 or 70 is broken. Simultaneously as this occurs, the switch 22 will place the headlights in the manual lower beam position and as both switches 20 and 22 return to their normal positions, no effect will be realized upon the headlights as flange portion 50 contacts intermediate portions of the contact 60 or 70 as the automatic dimming device no longer controls the circuits to the headlights. When both of the switches are simultaneously depressed and switch 22 changes the circuits from the manual lower beam position to a circuit which is controlled by the automatic dimming device, the headlights will be placed momentarily in the upper beam position as when flange 50 contacts either section 66 of contact 60 or indentations 74 of contact 70 as the sleeve 44 moves upward to its normal position where contact between the flange 50 and contact 60 or 70 is broken and the automatic device takes over and controls.

Manifestly switch 22 may be utilized in other circuits and with other switches than are disclosed in the noted applications, so that the position of the headlamps of a vehicle may be varied according to the dictates of the driver; and further the components of switch 20 such as plunger sleeve 44 may be insulated from the other portions of the switch 20 so that the circuit made between flange 50 and contact 60 or 70 is not grounded through the body of the switch 20 to support 30.

While the embodiment of the present invention as herein disclosed, constitutes a preferred form, it is to be understood that other forms might be adopted.

What is claimed is as follows:

1. In a lighting system for a vehicle the combination of a reciprocal plunger type dimmer switch of predetermined height, and; a second reciprocal plunger type dimmer switch, longitudinally aligned with and transversely spaced from said first mentioned dimmer switch having a height greater than said first mentioned dimmer switch so the foot of the operator of the vehicle may rest on said first mentioned dimmer switch while depressing said second mentioned dimmer switch a predetermined distance, said second mentioned dimmer switch having; a reciprocal plunger bodily movable between predetermined limits and a spring contact member of substantial length longitudinally aligned with and spaced from said plunger, said spring contact member having end portions disposed out of contact with said plunger when said plunger is at either of said limits and an intermediate portion of substantial length disposed in electrically contacting relation with a portion of said plunger when said plunger is between said limits.

2. In an electric switch, the combination comprising; a pair of tubular members telescopically arranged, an inwardly turned flange on the inner of said telescopic members arranged to define an opening on one end of said inner member, a wall on the outer of said telescopic members arranged to conceal said opening, a third tubular member concentric with said pair of tubular member, said third member having; one end attached to said wall and the other end extending through said opening and outwardly flanged to engage the inwardly turned flanged portions of said inner member for limiting the telescopic movement of said outer member in one direction, and a spring contact member disposed within said inner tubular member in longitudinal alignment with said third tubular member, said contact member having; outwardly bent portions on either end and an inwardly bent portion of substantial length intermediate said ends whereby only the inwardly bent portion of said member electrically contacts the flange portion of said third tubular member as said outer member is telescopically moved relative to said inner member.

3. In an electric switch, the combination comprising; a pair of tubular members telescopic on one another, an outwardly turned flange on one end of the inner of said telescopic members arranged for mounting both of said members, an inwardly turned flange on the other end of said inner telescopic member arranged to define an opening on said other end of said inner members, a wall on the outer of said telescopic members arranged to conceal said opening, a third tubular member concentrically arranged with said pair of members, said third member having; one end attached to said wall, the other end extending through said opening, and a flange on said other end arranged to engage the inwardly turned flange of said inner member for limiting the telescopic movement between said inner and outer members in one direction, a guide means concentrically arranged relative to said pair of tubular members, a coil spring disposed within said third tubular member and exterior to said guide for constantly urging said outer member in said one direction, and a spring contact with said inner member longitudinally aligned and laterally spaced from said guide, said spring contact having; outwardly bent portions on either end and an inwardly bent portion of substantial length intermediate said ends whereby only the inwardly bent portion of said member electrically contacts the flange portion of said third tubular member as said outer member is telescopically moved relative to said inner member.

4. In an electric switch, the combination comprising; a pair of tubular members telescopically arranged, an inwardly turned flange on the inner of said telescopic members arranged to define an opening on one end of said inner member, a wall on the outer of said telescopic members arranged to conceal said opening, a third tubular member concentric with said pair of tubular member, said third member having; one end attached to said wall and the other end extending through said opening and outwardly flanged to engage the inwardly turned flanged portions of said inner member for limiting the telescopic movement of said outer member in one direction, a spring means disposed within said third tubular member for constantly urging said outer member in said one direction, and a substantially tubular spring contact member concentrically disposed within said inner tubular member in longitudinal alignment with said third tubular member, said contact member having; outwardly bent portions on either end and an inwardly bent portion of substantial length intermediate said ends whereby only the inwardly bent portion of said member electrically contacts the flange portion of said third tubular member as said outer member is telescopically moved relative to said inner member.

5. In an electric switch, the combination comprising; a pair of tubular members telescopic on one another, an outwardly turned flange on one end of the inner of said telescopic members arranged for mounting both of said members, an inwardly turned flange on the other end of said inner telescopic member arranged to define an opening on said other end of said inner member, a wall on the outer of said telescopic members arranged to conceal said opening, a third tubular member concentrically arranged with said pair of members, said third member having; one end attached to said wall, the other end extending through said opening, and a flange on said other end arranged to engage the inwardly turned flange of said inner member for limiting the telescopic movement between said inner and outer members in one direction, a guide means concentrically arranged relative to said pair of tubular members, a coil spring disposed within said third tubular member and exterior to said guide for constantly urging said outer member in said one direction, and a tubular spring contact concentrically disposed within said inner member, said spring contact having; outwardly bent portions on either end and an inwardly bent portion of substantial length intermediate said ends whereby only the inwardly bent portion of said member electrically contacts the flange portion of said third tubular member as said outer member is telescopically moved relative to said inner member.

References Cited in the file of this patent
UNITED STATES PATENTS

| | | |
|---|---|---|
| 2,191,926 | Lemire | Feb. 27, 1940 |
| 2,249,001 | Joost et al. | July 15, 1941 |
| 2,277,902 | Carbonaro | Mar. 31, 1942 |
| 2,279,753 | Knopp | Apr. 14, 1942 |
| 2,453,231 | Kavanagh | Nov. 9, 1948 |
| 2,526,061 | Batcheller | Oct. 17, 1950 |
| 2,572,335 | Hafke | Oct. 23, 1951 |
| 2,611,843 | Bourne | Sept. 23, 1952 |
| 2,629,090 | Kerkau | Feb. 17, 1953 |

FOREIGN PATENTS

| | | |
|---|---|---|
| 85,134 | Switzerland | Oct. 20, 1919 |